(12) United States Patent
Lee et al.

(10) Patent No.: US 12,244,694 B2
(45) Date of Patent: Mar. 4, 2025

(54) METHOD FOR PROVIDING ORACLE SERVICE OF BLOCKCHAIN NETWORK BY USING ZERO-KNOWLEDGE PROOF AND AGGREGATOR TERMINAL USING THE SAME

(71) Applicant: CPLABS, INC., Seongnam-si (KR)

(72) Inventors: Seung Hwa Lee, Seoul (KR); Jeong Hyuk Lee, Seongnam-si (KR); Joon Sun Uhr, Seongnam-si (KR)

(73) Assignee: CPLABS, INC. (KR)

( * ) Notice: Subject to any disclaimer, the term of this patent is extended or adjusted under 35 U.S.C. 154(b) by 185 days.

(21) Appl. No.: 17/994,734

(22) Filed: Nov. 28, 2022

(65) Prior Publication Data

US 2024/0129113 A1 Apr. 18, 2024

(30) Foreign Application Priority Data

Oct. 12, 2022 (KR) ........................ 10-2022-0130237

(51) Int. Cl.
  *H04L 9/08* (2006.01)
  *H04L 9/32* (2006.01)
(52) U.S. Cl.
  CPC ............ *H04L 9/0825* (2013.01); *H04L 9/083* (2013.01); *H04L 9/3218* (2013.01)
(58) Field of Classification Search
  CPC ..... H04L 9/0825; H04L 9/083; H04L 9/3218; H04L 9/50; H04L 9/0861
  See application file for complete search history.

(56) References Cited

U.S. PATENT DOCUMENTS

2017/0075938 A1* 3/2017 Black ................... H04L 9/3239
2019/0356493 A1 11/2019 Fisher et al.
(Continued)

FOREIGN PATENT DOCUMENTS

| JP | 2022-510790 A | 1/2022 |
| KR | 10-2020-0120015 A | 10/2020 |
| KR | 10-2021-0120514 A | 10/2021 |

OTHER PUBLICATIONS

Extended European Search Report for EP Application No. 22208860.1-1218, dated Aug. 18, 2023; 12 pages.
(Continued)

*Primary Examiner* — Abiy Getachew
(74) *Attorney, Agent, or Firm* — Rimon Law, P.C.

(57) ABSTRACT

A method for providing oracle service of a blockchain network by using zero-knowledge proof includes steps of: (a) in response to feeder terminals registering data feeder transactions, including commitments generated with a commitment key and off-chain data, encrypted data generated by encrypting the off-chain data with a public key and data validation values proving with feeder zero-knowledge proof keys that the commitments are identical to the off-chain data, onto the blockchain network, the aggregator terminal acquiring at least one data feeder transaction therefrom; (b) the aggregator terminal verifying data validation values with its corresponding feeder zero-knowledge proof key, decrypting encrypted data with a private key, generating on-chain data from the decrypted data using a calculator and calculation validation values proving with an aggregator zero-knowledge proof key that the on-chain data is generated from the decrypted data, and registering the on-chain data and the calculation validation values onto the blockchain network.

12 Claims, 4 Drawing Sheets

(56) References Cited

U.S. PATENT DOCUMENTS

| | | | |
|---|---|---|---|
| 2020/0127834 A1* | 4/2020 | Westland | H04L 9/3221 |
| 2021/0089676 A1 | 3/2021 | Ford et al. | |
| 2021/0110049 A1* | 4/2021 | Kumar | H04L 9/0825 |
| 2024/0015028 A1* | 1/2024 | Wang | H04L 9/321 |

OTHER PUBLICATIONS

KR application No. 10-2022-0130237 Office Action dated Dec. 8, 2022.

* cited by examiner

METHOD FOR PROVIDING ORACLE SERVICE OF BLOCKCHAIN NETWORK BY USING ZERO-KNOWLEDGE PROOF AND AGGREGATOR TERMINAL USING THE SAME

CROSS REFERENCE OF RELATED APPLICATION

This present application claims the benefit of the earlier filing date of Korean provisional patent application No. 10-2022-0130237, filed Oct. 12, 2022, the entire contents of which being incorporated herein by reference.

FIELD OF THE DISCLOSURE

The present disclosure relates to a method for providing oracle service of a blockchain network by using zero-knowledge proof and an aggregator terminal using the same; and more particularly, to the method for providing the oracle service of the blockchain network that improves reliability of on-chain data by proving, without disclosing off-chain data, that the on-chain data are generated from the off-chain data, and the aggregator terminal using the same.

BACKGROUND OF THE DISCLOSURE

An oracle on a blockchain network may bring data outside the blockchain network into the blockchain network or send data inside the blockchain network to the outside of the blockchain network, and thus the oracle provides a way of connecting an isolated blockchain ecosystem with an outside world. Herein, the data located outside the blockchain network is referred to as off-chain data, and the off-chain data brought inside the blockchain network is referred to as on-chain data.

The blockchain network is an immutable distributed ledger technology that makes it almost impossible to forge and falsify data that forms a blockchain by connecting blocks of data with a chain. Herein, the data can be managed by the blockchain only when the data enters the blockchain network. As such, if the data does not enter the blockchain network, or if the data is forged during entering the blockchain network, it becomes difficult to trust the data even when they are managed by the blockchain network.

However, it is not easy as one might think to bring in data from the real world to the blockchain network. In order for the off-chain data to be converted to the on-chain data, intermediaries that introduce the off-chain data into the blockchain network are required. Hence, a problem for the oracle would be whether these intermediaries are reliable.

As attempts to solve the problem of the oracle, various solutions are being introduced. Such attempts include making decisions regarding the off-chain data by voting of cryptocurrency owners, choosing median values for the off-chain data, and utilizing a middleware that provides reliable data between the real world and the blockchain, and the like.

Herein, Oraclize, Chainlink, iCash, etc., are some examples of the middleware that provides oracle service.

For instance, Chainlink stores token prices of centralized exchanges in smart contracts and provides the oracle service so that the token prices can be used in other blockchain network services. By doing so, many DeFi service providers are able to provide various types of service by using the registered token prices. Essentially, oracle service providers such as Chainlink are ensuring reliability of the on-chain data by storing the off-chain data in the on-chain smart contracts.

In the conventional oracle service such as the one mentioned above, the off-chain data is provided from data feeders designated by the oracle service providers and ensures the reliability of the on-chain data by disclosing the on-chain data generated therefrom. However, this does not guarantee reliabilities of whether the off-chain data from which the on-chain data are generated is indeed provided by the designated data feeders, and whether the on-chain data produced is indeed generated from the off-chain data provided by the designated data feeders.

As a means to guarantee the reliability of whether the on-chain data produced is indeed generated from the off-chain data provided by the designated data feeders, the off-chain data themselves provided by the designated data feeders can be disclosed. However, when the off-chain data are disclosed, the reliability of the oracle service itself is compromised since a front-running attack may occur by taking the advantage of using the off-chain data in advance.

Therefore, the present disclosure is proposing a method of protecting the off-chain data provided from the data feeders while ensuring that the on-chain data for the oracle service is reliably generated from the off-chain data provided.

SUMMARY OF THE DISCLOSURE

It is an object of the present disclosure to solve all the aforementioned problems.

It is another object of the present disclosure to protect off-chain data provided from feeders, and guarantee reliability of the off-chain data.

It is still another object of the present disclosure to guarantee reliability of on-chain data generated by using the off-chain data.

It is still yet another object of the present disclosure to guarantee that the on-chain data are generated from the off-chain data while protecting the off-chain data.

In accordance with one aspect of the present disclosure, there is provided a method for providing oracle service of a blockchain network by using zero-knowledge proof, including steps of: (a) in response to each of multiple feeder terminals registering each of data feeder transactions including (i) each of commitments generated by using a commitment key and each of off-chain data, (ii) each of encrypted data generated by encrypting each of the off-chain data with a public key, and (iii) each of data validation values acquired by proving with each of feeder zero-knowledge proof keys that each of the commitments is identical to each of the off-chain data corresponding to each of the encrypted data, onto the blockchain network, acquiring, by an aggregator terminal, a 1-st data feeder transaction to a k-th data feeder transaction, registered onto the blockchain network during a specific period, among the data feeder transactions registered onto the blockchain network for every predetermined period, wherein k is an integer bigger than or equal to 1; and (b) (i) verifying, by the aggregator terminal, an i-th data validation value in an i-th data feeder transaction, among the 1-st data feeder transaction to the k-th data feeder transaction, by using an i-th feeder zero-knowledge proof key, wherein i is an integer ranging from 1 to k, and generating, by the aggregator terminal, an i-th decrypted data by decrypting an i-th encrypted data with a private key corresponding to the public key, thus generating a 1-st decrypted data to a k-th decrypted data, (ii) generating, by the aggregator terminal, on-chain data by performing calculation operations on the 1-st decrypted data to the k-th decrypted data with a preset calculator and generating, by the aggregator terminal, calculation validation values acquired by proving with an aggregator zero-knowledge proof key that the on-chain data are generated by performing the calculation operations on the 1-st decrypted data to the k-th decrypted data with the preset calculator, and (iii) registering, by the aggregator terminal, the on-chain data and the calculation validation values onto the blockchain network.

As one example, before the step of (a), further including steps of: (a0) registering, by the aggregator terminal, the commitment key, the public key and the aggregator zero-knowledge proof key which are issued by a trusted third party onto the blockchain network.

As one example, at the step of (a), a specific feeder terminal, which is one of the multiple feeder terminals, (i) acquires the commitment key and the public key from the blockchain network and thus generates specific encrypted data and a specific commitment for specific off-chain data, (ii) generates a specific data validation value by using a specific feeder zero-knowledge proof key issued by the trusted third party, and (iii) registers a specific data feeder transaction including the specific commitment, the specific encrypted data and the specific data validation value onto the blockchain network.

As one example, in response to the specific feeder terminal making a request for generating the specific feeder zero-knowledge proof key to the trusted third party by using the public key acquired from the blockchain network, the trusted third party generates the specific zero-knowledge proof key by using the commitment key and the public key.

As one example, the aggregator terminal makes a request for generating keys of the preset calculator to the trusted third party and thus instructs the trusted third party to (i) input first security parameters to a first key-generating module so as to generate the commitment key, (ii) input second security parameters to a second key-generating module so as to generate the private key and the public key, (iii) input the commitment key and the preset calculator to a third key-generating module so as to generate the aggregator zero-knowledge proof key, and thus (iv) transmit the commitment key, the private key, the public key and the aggregator zero-knowledge proof key to the aggregator terminal.

As one example, at the step of (b), the aggregator terminal acquires the i-th feeder zero-knowledge proof key from the blockchain network to verify the i-th data validation value, wherein the i-th feeder zero-knowledge proof key is registered onto the blockchain network by an i-th feeder terminal who registered the i-th data feeder transaction.

In accordance with another aspect of the present disclosure, there is provided an aggregator terminal for providing oracle service of a blockchain network by using zero-knowledge proof, including: at least one memory that stores instructions; and at least one processor configured to execute the instructions to perform or support another device to perform: (I) in response to each of multiple feeder terminals registering each of data feeder transactions including (i) each of commitments generated by using a commitment key and each of off-chain data, (ii) each of encrypted data generated by encrypting each of the off-chain data with a public key, and (iii) each of data validation values acquired by proving with each of feeder zero-knowledge proof keys that each of the commitments is identical to each of the off-chain data corresponding to each of the encrypted data, onto the blockchain network, a process of acquiring a 1-st data feeder transaction to a k-th data feeder transaction, registered onto the blockchain network during a specific period, among the data feeder transactions registered onto the blockchain network for every predetermined period, wherein k is an integer bigger than or equal to 1; and (II) (i) a process of verifying an i-th data validation value in an i-th data feeder transaction, among the 1-st data feeder transaction to the k-th data feeder transaction, by using an i-th feeder zero-knowledge proof key, wherein i is an integer ranging from 1 to k, and generating an i-th decrypted data by decrypting an i-th encrypted data with a private key corresponding to the public key, thus generating a 1-st decrypted data to a k-th decrypted data, (ii) a process of generating on-chain data by performing calculation operations on the 1-st decrypted data to the k-th decrypted data with a preset calculator and generating calculation validation values acquired by proving with an aggregator zero-knowledge proof key that the on-chain data are generated by performing the calculation operations on the 1-st decrypted data to the k-th decrypted data with the preset calculator, and (iii) a process of registering the on-chain data and the calculation validation values onto the blockchain network.

As one example, before the process of (I), the process further performs a process of: (I0) registering the commitment key, the public key and the aggregator zero-knowledge proof key which are issued by a trusted third party onto the blockchain network.

As one example, at the process of (I), a specific feeder terminal, which is one of the multiple feeder terminals, (i) acquires the commitment key and the public key from the blockchain network and thus generates specific encrypted data and a specific commitment for specific off-chain data, (ii) generates a specific data validation value by using a specific feeder zero-knowledge proof key issued by the trusted third party, and (iii) registers a specific data feeder transaction including the specific commitment, the specific encrypted data and the specific data validation value onto the blockchain network.

As one example, in response to the specific feeder terminal making a request for generating the specific feeder zero-knowledge proof key to the trusted third party by using the public key acquired from the blockchain network, the trusted third party generates the specific zero-knowledge proof key by using the commitment key and the public key.

As one example, the processor makes a request for generating keys of the preset calculator to the trusted third party and thus instructs the trusted third party to (i) input first security parameters to a first key-generating module so as to generate the commitment key, (ii) input second security parameters to a second key-generating module so as to generate the private key and the public key, (iii) input the commitment key and the preset calculator to a third key-generating module so as to generate the aggregator zero-knowledge proof key, and thus (iv) transmit the commitment key, the private key, the public key and the aggregator zero-knowledge proof key to the processor.

As one example, at the processes of (II), the processor acquires the i-th feeder zero-knowledge proof key from the blockchain network to verify the i-th data validation value, wherein the i-th feeder zero-knowledge proof key is registered onto the blockchain network by an i-th feeder terminal who registered the i-th data feeder transaction.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Figure 1:
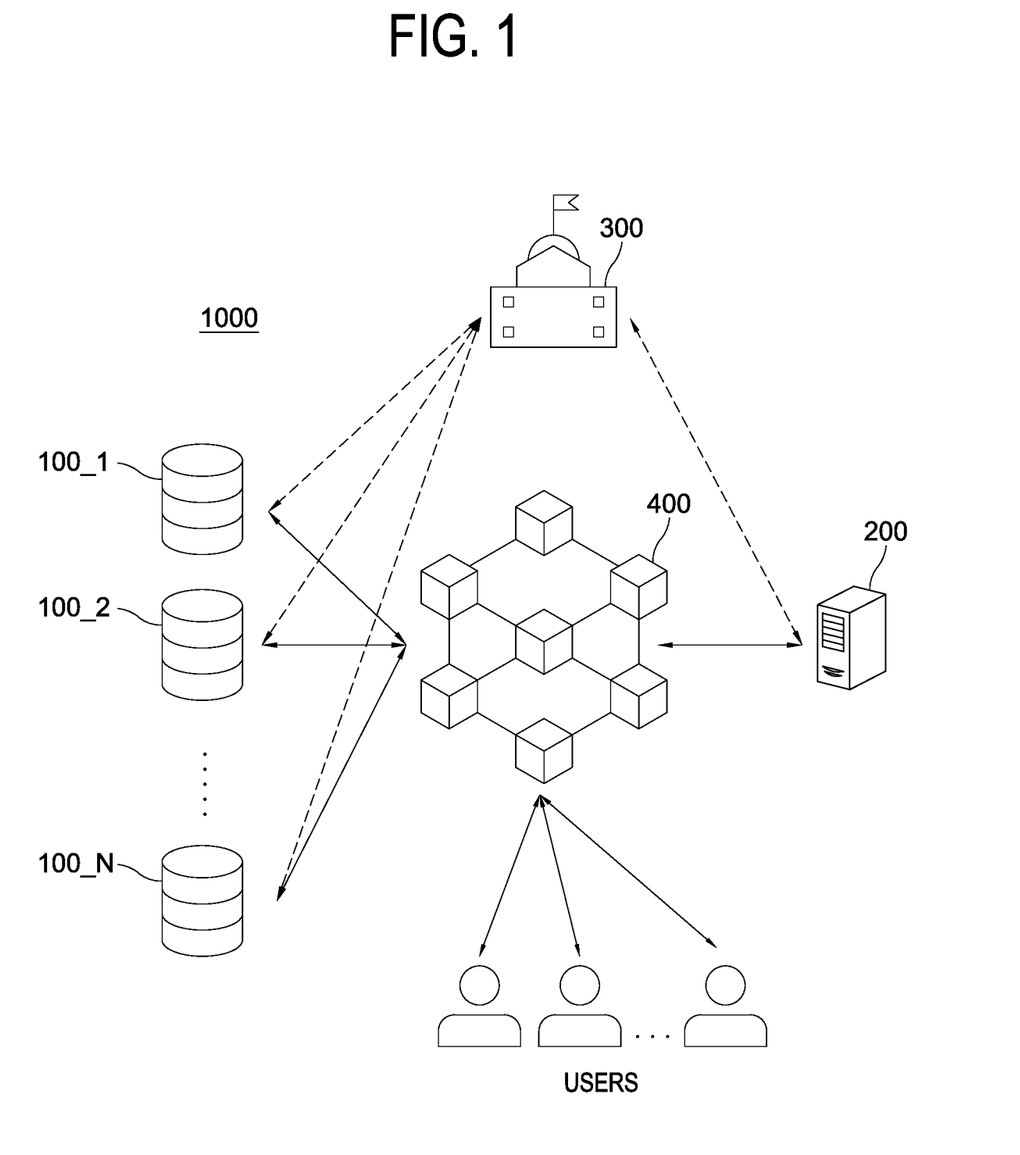
FIG. 1 is a drawing schematically illustrating a system for providing oracle service of a blockchain network by using zero-knowledge proof in accordance with one example embodiment of the present disclosure.

FIG. 1 is a drawing schematically illustrating a system for providing oracle service of a blockchain network by using zero-knowledge proof in accordance with one example embodiment of the present disclosure. By referring to FIG. 1, the system 100 may include a plurality of feeder terminals 100_1, 100_2, . . . , 100_$n$, an aggregator terminal 200, a trusted third party 300 and the blockchain network 400.

First, each of the feeder terminals 100_1, 100_2, . . . , 100_$n$ may be an entity that (i) generates each of encrypted data and each of commitments for each of off-chain data, (ii) generates each of data validation values for the zero-knowledge proof, and (iii) registers the commitments, the encrypted data and the data validation values onto the blockchain network 400. Herein, each of the feeder terminals 100_1, 100_2, . . . , 100_$n$ may include an IoT device, a database, a personal computer (PC), a mobile computer, a/an PDA/EDA, a mobile phone, a smartphone, a tablet, an information providing server, a data collection bot and any device that provides various information generated in the real world, such as by artificial intelligence, or analysis/statistical data generated based on said information. Herein, the off-chain data may include any information generated in the real world, such as voting information, price information, payment information, logistics information, news information, etc., or may include information processed therefrom, such as analysis information, statistical information, sensing information, etc. Also, each of the feeder terminals 100_1, 100_2, . . . , 100_$n$ may include a memory for storing instructions to provide the oracle service of the blockchain network by using the zero-knowledge proof, and a processor for providing the oracle service of the blockchain network by using the zero-knowledge proof according to the instructions in the memory.

Specifically, each of the feeder terminals 100_1, 100_2, . . . , 100_$n$ may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (Operating System) and software configuration of applications that achieve specific purposes may be further included.

Next, the aggregator terminal 200 may be an entity that provides the oracle service, wherein the aggregator terminal 200 (i) decrypts the encrypted data registered by each of the feeder terminals 100_1, 100_2, 100_n, (ii) performs calculation operations thereon to generate on-chain data, and (iii) registers calculation validation values for the zero-knowledge proof and the on-chain data onto the blockchain network 400. Herein, the aggregator terminal 200 may include, but is not limited to, a server, a personal computer (PC), a mobile computer, a/an PDA/EDA, a mobile phone, a smartphone, a tablet, etc., and may include any device that performs computing operations. Also, the aggregator terminal 200 may include a memory for storing instructions to provide the oracle service of the blockchain network by using the zero-knowledge proof, and a processor for providing the oracle service of the blockchain network by using the zero-knowledge proof according to the instructions in the memory.

Specifically, the aggregator terminal 200 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (Operating System) and software configuration of applications that achieve specific purposes may be further included.

Next, the trusted third party 300 may be an entity that generates keys used for the oracle service of the blockchain network. Herein, the trusted third party 300 may include, but is not limited to, a personal computer (PC), a mobile computer, a/an PDA/EDA, a mobile phone, a smartphone, a tablet, a server, etc., and may include any device that performs computing operations. Meanwhile, the trusted third party 300 may be implemented as a smart contract operating in a virtual machine of the blockchain network 400 or as a computing device linked to the aggregator terminal 200.

Next, the blockchain network 400 may be operated by multiple blockchain nodes and may be an entity that performs a data distribution process of recording blocks of data connected as a blockchain onto a distributed ledger.

A method of providing the oracle service of the blockchain network by using the system configured as explained above in accordance with one example embodiment of the present disclosure is described as follows.

First, by referring to FIG. 2, a process of generating the keys to be used for the zero-knowledge proof in the method of providing the oracle service of the blockchain network in accordance with one example embodiment of the present disclosure is described below.

In order to acquire the keys for providing the oracle service of the blockchain network, the aggregator terminal 200 may request for generating keys of a preset calculator to the trusted third party 300 at a step of S11.

Herein, the preset calculator may be a calculator that provides the on-chain data by processing the off-chain data and may include a calculation logic or a calculation module for converting the off-chain data into the on-chain data.

For example, the calculator may calculate a representative value numerically representing characteristics of the off-chain data and may be a function that calculates an average value, a median value, a mode value, a range value, an interquartile range value, a variance value, a standard deviation value, etc. of the off-chain data. In addition, the calculator may be a function for statisticizing inventory information on products in different regions by using sales information on the products in different regions. Also, the calculator may be a function that generates prediction information for predicting a specific result based on information from news, internet sites, etc. However, functions used by the calculator in the present disclosure are not limited to the functions mentioned above and may include various functions that generate specific types of information by processing information in the real world.

Then, the trusted third party 300 may (i) input first security parameters to a first key-generating module so as to instruct the first key-generating module to generate a commitment key, (ii) input second security parameters to a second key-generating module so as to instruct the second key-generating module to generate a private key and a public key, and (iii) input the commitment key and the preset calculator to a third key-generating module so as to instruct the third-key generating module to generate an aggregator zero-knowledge proof key at a step of S12. Herein, the first security parameters and the second security parameters may be security parameters produced for generating the keys of the preset calculator, and the first security parameters and the second security parameters may be the same or different from each other.

For example, the first key-generating module may be a key generation algorithm of PVC (Pedersen Vector Commitment), and the first security parameters $\lambda$ may be inputted to the PVC key generation algorithm as follows to generate the commitment key CK.

PVC. Keygen($\lambda$)→(CK)

However, the first key-generating module of the present disclosure is not limited to the PVC key generation algorithm, and may utilize key generating modules of various commitment schemes for the zero-knowledge proof.

In addition, the second key-generating module may be a key generation algorithm of ElGamal Encryption, and the second security parameters $\lambda$ may be inputted to the ElGamal key generation algorithm as follows to generate the public key PK and the private key SK.

ElGamal. Keygen($\lambda$)→(PK, SK)

However, the second key-generating module of the present disclosure is not limited to the ElGamal Encryption, and may utilize key generating modules of various encryption algorithms that perform data encryption and data decryption by using asymmetric keys including the public key and the private key.

Also, the third key-generating module may be a key generation algorithm of CP-SNARK (simulation-extractable commit and prove succinct non-interactive argument of knowledge), and the commitment key CK and the calculator R may be inputted to the CP-SNARK key-generation algorithm as follows to generate the aggregator zero-knowledge proof key CRSa.

CP-SNARK. Keygen(CK, R)→CRSa

However, the third key-generating module of the present disclosure is not limited to the CP-SNARK, and may utilize key generating modules of various zero-knowledge proof algorithms that generate validation values for the zero-knowledge proof and prove the same.

Further, the trusted third party 300 may issue the commitment key, the private key, the public key and the aggregator zero-knowledge proof key to the aggregator terminal 200 at a step of S13.

Afterwards, the aggregator terminal 200 may register the commitment key, the public key and the aggregator zero-knowledge proof key issued by the trusted third party 300 onto the blockchain network 400 at a step of S14.

Herein, the aggregator terminal 200 may broadcast a transaction including the commitment key, the public key and the aggregator zero-knowledge proof key to the blockchain network 400, or may broadcast each of transactions respectively including the commitment key, the public key and the aggregator zero-knowledge proof key to the blockchain network 400. Accordingly, a block may be generated as a result of reaching distributed consensus among the blockchain nodes included in the blockchain network 400, and then the commitment key, the public key and the aggregator zero-knowledge proof key may be registered onto the blockchain network 400 by adding the block generated to the blockchain of the distributed ledger.

Meanwhile, a specific feeder terminal 100_1, which is one of the multiple feeder terminals 100_1, 100_2, . . . , 100_n, may acquire the public key from the blockchain network 400 at a step of S15, and then send a request for key generation to the trusted third party 300 by using the public key at a step of S16.

Herein, the specific feeder terminal 100_1 may be an authorized entity that consented in advance to provide the off-chain data. Also, the specific feeder terminal 100_1 is described herein to obtain the public key from the blockchain network 400, but it may also be possible that the specific feeder terminal 100_1 obtains the public key directly from the aggregator terminal 200.

Then, the trusted third party 300 may generate a feeder zero-knowledge proof key by using the commitment key and the public key at a step of S17, and then issue the feeder zero-knowledge proof key to the specific feeder terminal 100_1 at a step of S18.

Herein, the trusted third party 300 may input the public key received from the specific feeder terminal 100_1 and the commitment key to the third key-generating module, to thereby generate a specific feeder zero-knowledge proof key for the specific feeder terminal 100_1.

Afterwards, the specific feeder terminal 100_1 may register the specific feeder zero-knowledge proof key issued by the trusted third party 300 onto the blockchain network 400 at a step of S19.

Herein, the specific feeder terminal 100_1 may broadcast a transaction including the specific feeder zero-knowledge proof key to the blockchain network 400. Accordingly, a block may be generated as a result of reaching distributed consensus among the blockchain nodes included in the blockchain network 400, and then the specific zero-knowledge proof key may be registered onto the blockchain network 400 by adding the block generated to the blockchain of the distributed ledger.

Through the processes mentioned above, each feeder zero-knowledge proof key of each feeder terminal, the commitment key, the public key and the aggregator zero-knowledge proof key, required for providing the oracle service of the blockchain network in accordance with one example embodiment of the present disclosure, are registered onto the blockchain network 400.

Next, by referring to FIG. 3, a process of the feeder terminals registering off-chain data onto the blockchain network in the method of providing the oracle service of the blockchain network in accordance with one example embodiment of the present disclosure is described below.

Figure 2:
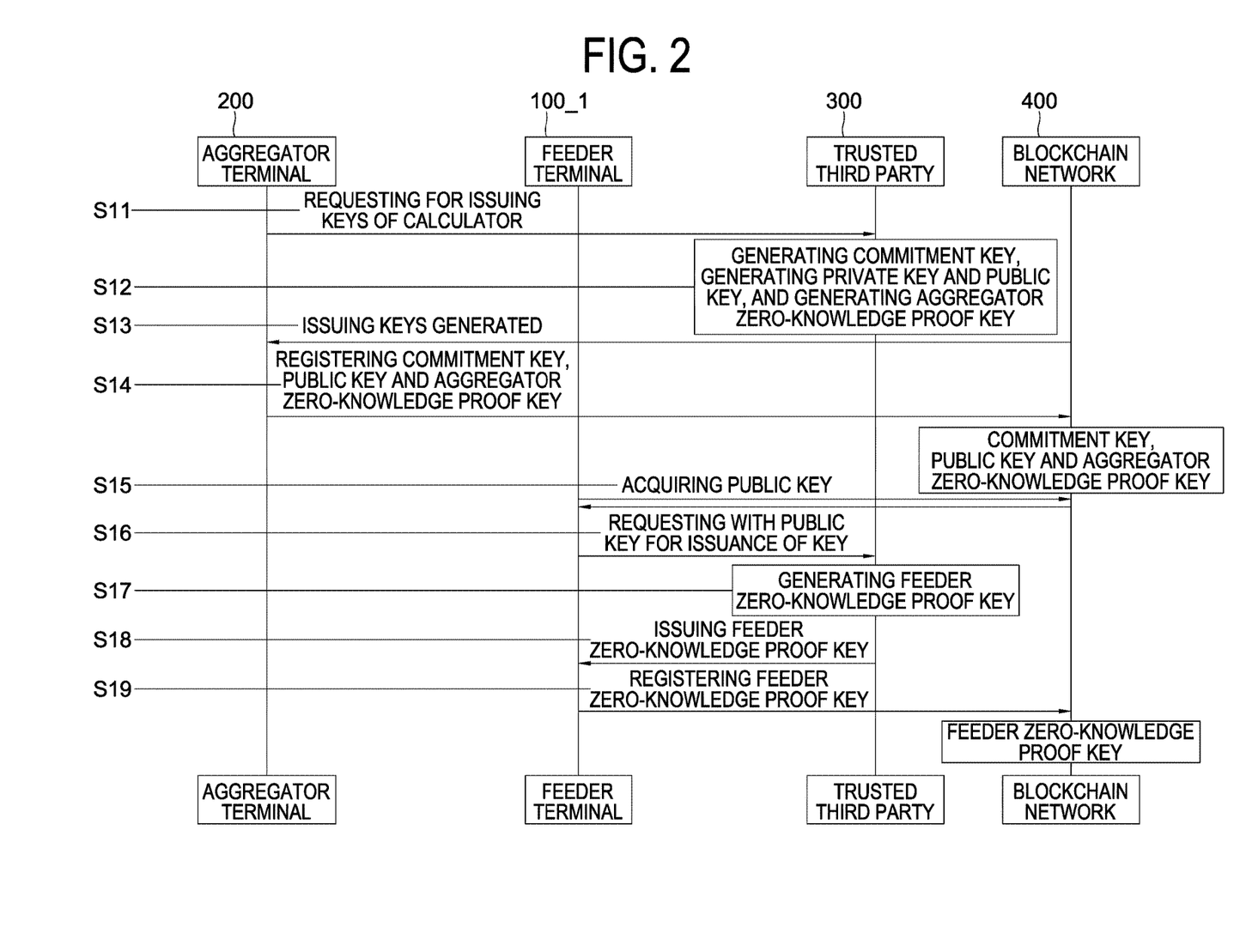
FIG. 2 is a drawing schematically illustrating a process of generating and registering keys in a method of providing the oracle service of the blockchain network in accordance with one example embodiment of the present disclosure.

On condition that the commitment key, the public key, the aggregator zero-knowledge proof key and the feeder zero-knowledge proof key have been registered according to the description above made with reference to FIG. 2, each of the feeder terminals 100_1, 100_2, . . . , 100_n may register each of data feeder transactions including (i) each of the commitments generated by using the commitment key and each of the off-chain data, (ii) each of the encrypted data generated by encrypting each of the off-chain data with the public key, and (iii) each of the data validation values acquired by proving with each of feeder zero-knowledge proof keys that each of the commitments is identical to each of the off-chain data corresponding to each of the encrypted data, onto the blockchain network 400.

This is described below with reference to the specific feeder terminal 100_1, which is one of the multiple feeder terminals 100_1, 100_2, . . . , 100_n.

The specific feeder terminal 100_1 which intends to provide the off-chain data to the aggregator terminal may acquire the commitment key and the public key from the blockchain network 400 at a step of S21.

Then, the specific feeder terminal 100_1 may generate a specific commitment and specific encrypted data corresponding to specific off-chain data at a step of S22 by respectively using the commitment key and the public key.

Specifically, the specific feeder terminal 100_1 may input the commitment key and the specific off-chain data to a commitment generating module to thereby generate the specific commitment, and may input the public key and the specific off-chain data to an encryption module to thereby generate the specific encrypted data.

For example, the commitment generating module may be a commitment generation algorithm of PVC (Pedersen Vector Commitment), and the commitment key CK and the specific off-chain data M may be inputted to the PVC commitment generation algorithm as follows to generate the specific commitment CM.

PVC. Commit(CK, M)→(CM, O)

Herein, O is a commitment open value.

However, the commitment generating module of the present disclosure is not limited to the PVC commitment generation algorithm, and may utilize commitment generating modules of various commitment schemes for the zero-knowledge proof.

In addition, the encryption module may be an encryption algorithm of ElGamal Encryption, and the public key PK and the specific off-chain data M may be inputted to the ElGamal encryption algorithm as follows to generate the specific encrypted data CT.

Elgamal. Enc(PK, {M, O})→(CT, r)

Herein, r is a random value used in encrypted texts.

However, the encryption module of the present disclosure is not limited to the ElGamal encryption, and may utilize encryption modules of various encryption algorithms that perform the data encryption and the data decryption by using the asymmetric keys including the public key and the private key.

Afterwards, the specific feeder terminal 100_1 may generate a specific data validation value by using the specific feeder zero-knowledge proof key at a step of S23. In other words, the specific feeder terminal 100_1 may generate the specific data validation value which proves that the specific commitment is identical to the specific off-chain data corresponding to the specific encrypted data.

Herein, the specific feeder terminal 100_1 may input the specific feeder zero-knowledge proof key, the specific commitment, the specific off-chain data and the specific encrypted data to a zero-knowledge proof module to thereby output the specific data validation value.

For example, the zero-knowledge proof module may be a zero-knowledge proof module of CP-SNARK, and specific feeder zero-knowledge proof key CRSf, the specific commitment CM, the specific off-chain data M and the specific encrypted data CT may be inputted to the CP-SNARK zero-knowledge proof module as follows to generate the specific data validation value $\pi 1$.

CP-SNARK. Prove(CRSf, {CM, M, O}, {CT, M, r})→$\pi 1$

However, the zero-knowledge proof module of the present disclosure is not limited to the CP-SNARK, and may utilize zero-knowledge proof modules of various zero-knowledge proof algorithms that generate the validation values for the zero-knowledge proof and prove the same.

Further, the specific feeder terminal 100_1 may register a specific data feeder transaction, including the specific commitment, the specific encrypted data and the specific data validation value, onto the blockchain network 400 at a step of S24.

Herein, the specific feeder terminal 100_1 may broadcast a transaction including the specific commitment, the specific encrypted data and the specific data validation value to the blockchain network 400. Accordingly, a block may be generated as a result of reaching distributed consensus among the blockchain nodes included in the blockchain network 400, and then the specific commitment, the specific encrypted data and the specific data validation value may be registered onto the blockchain network 400 by adding the block generated to the blockchain of the distributed ledger.

Through this, each of the feeder terminals 100_1, 100_2, . . . , 100_n may reliably prove that each of the encrypted data is generated from each of the off-chain data without disclosing each of the off-chain data.

Figure 4:
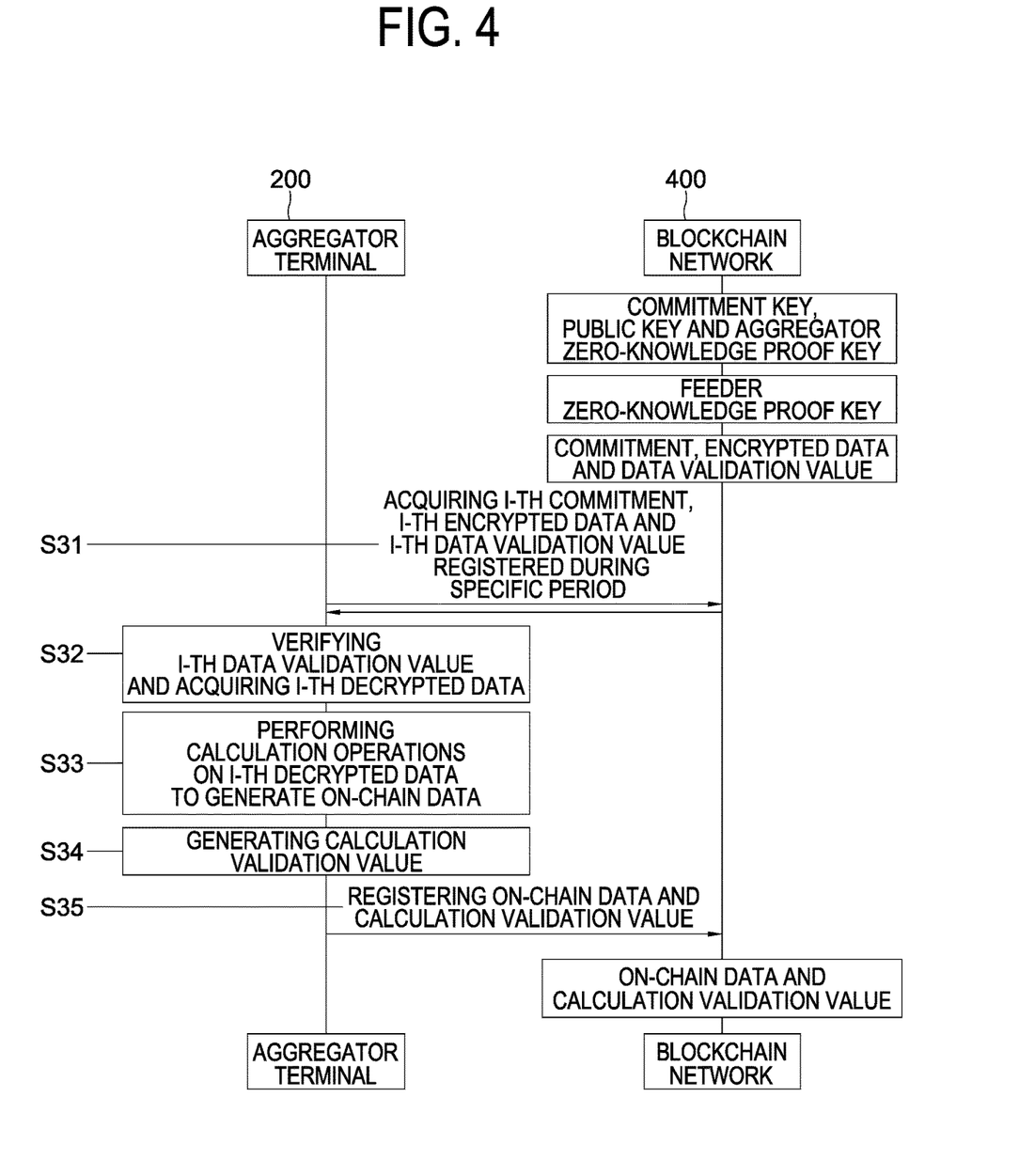
FIG. 4 is a drawing schematically illustrating a process of an aggregator terminal generating on-chain data from the off-chain data provided by the feeder terminal in the method of providing the oracle service of the blockchain network in accordance with one example embodiment of the present disclosure.

Next, by referring to FIG. 4, a process of the aggregator terminal registering the off-chain data provided by the feeder terminal onto the blockchain network as the on-chain data in the method of providing the oracle service of the blockchain network is shown in accordance with one example embodiment of the present disclosure.

Figure 3:
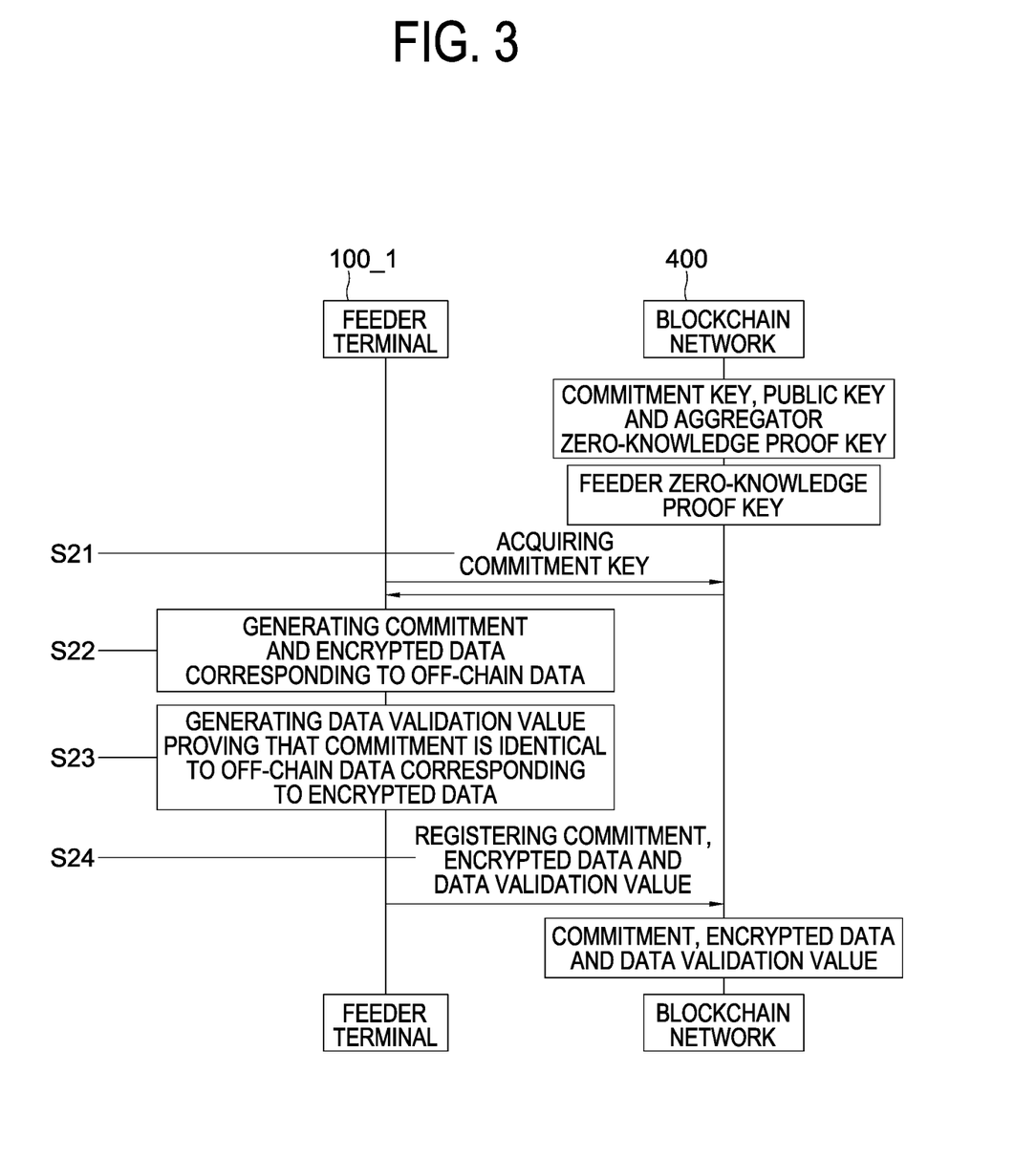
FIG. 3 is a drawing schematically illustrating a process of feeder terminals registering off-chain data onto the blockchain network in the method of providing the oracle service of the blockchain network in accordance with one example embodiment of the present disclosure.

On condition that each of the multiple feeder terminals 100_1, 100_2 . . . , 100_n has registered each of the data feeder transactions including (i) each of the commitments generated by using the commitment key and each of the off-chain data, (ii) each of the encrypted data generated by encrypting each of the off-chain data with the public key, and (iii) each of the data validation values acquired by proving with each of the feeder zero-knowledge proof keys that each of the commitments is identical to each of the off-chain data corresponding to each of the encrypted data, onto the blockchain network 400 according to the description above made with reference to FIG. 3, the aggregator terminal 200 may acquire a 1-st data feeder transaction to a k-th data feeder transaction, registered onto the blockchain network 400 during a specific period, among the data feeder transactions registered onto the blockchain network 400 for every predetermined period. Herein, k is an integer bigger than or equal to 1. For example, the data feeder transactions may be registered onto the blockchain network 400 every predetermined period of one hour, and then the aggregator terminal may acquire the 1-st data feeder transaction to the k-th data feeder transaction that are registered onto the blockchain network 400 during the specific period, for example, data feeder transactions registered during a one hour period from 1 p.m. to 2 p.m.

Following, the aggregator terminal 200 may acquire an i-th commitment, i-th encrypted data and an i-th data validation value from an i-th data feeder transaction at a step of S31, wherein the i-th data feeder transaction refers to each of the 1-st data feeder transaction to the k-th data feeder transaction. Herein, i is an integer that is bigger than or equal to 1 and smaller or equal to k.

Afterwards, the aggregator terminal 200 may verify the i-th data validation value by using an i-th feeder zero-knowledge proof key and generate an i-th decrypted data by decrypting the i-th encrypted data with the private key corresponding to the public key, thus generating a 1-st decrypted data to a k-th decrypted data at a step of S32. Herein, only "i" has been mentioned for description in FIG. 4 for convenience of explanation, but it should be understood that the same description equally applies to each of 1 to k.

In other words, given that each of a 1-st feeder zero-knowledge proof key to a k-th feeder zero-knowledge proof key respectively corresponding to the 1-st data feeder transaction to the k-th data feeder transaction is referred to as the i-th feeder zero-knowledge proof key, the aggregator terminal 200 may acquire the i-th feeder zero-knowledge proof key from the blockchain network 400, and then input the i-th feeder zero-knowledge proof key, the i-th encrypted data, the i-th commitment and the i-th data validation value to a zero-knowledge verification module to thereby verify the i-th data validation value.

For example, the zero-knowledge verification module may be a zero-knowledge verification module of CP-SNARK, and the i-th feeder zero-knowledge proof key CRSf_i, the i-th encrypted data CT_i, the i-th commitment CM_i and the i-th data validation value $\pi 1\_i$ may be inputted to the CP-SNARK zero-knowledge verification module as follows to generate a data verification value(0 or 1). Herein, the data validation value is determined as true if the data verification value is 1, and the data validation value is determined as false if the data verification value is 0.

CP-SNARK. Verify(CRSf_i, CT_i, CM_i, $\pi 1\_i$)→0/1

However, the zero-knowledge verification module of the present disclosure is not limited to the CP-SNARK, and may utilize zero-knowledge verification modules of various zero-knowledge proof algorithms that generate the validation values for the zero-knowledge proof and verify the same.

Following, the aggregator terminal 200 may input the i-th encrypted data, corresponding to the data validation value verified to be true, to a decryption module, in order to generate the i-th decrypted data.

For example, the decryption module may be a decryption algorithm of ElGamal Encryption, and the private key SK and the i-th encrypted data CT_i may be inputted to the ElGamal decryption algorithm as follows to generate the i-th decrypted data m_i.

Elgamal. Dec(SK, CT_i)→(m_i, O_i)

However, the decryption module of the present disclosure is not limited to the ElGamal encryption, and may utilize decryption modules of various encryption algorithms that perform the data encryption and the data decryption by using the asymmetric keys including the public key and the private key.

Next, the aggregator terminal 200 may generate the on-chain data by performing calculation operations on the i-th decrypted data, i.e., the 1-st decrypted data to the k-th decrypted data, with the preset calculator at a step of S33.

Herein, the aggregator terminal 200 may input the i-th decrypted data m_i to the preset calculator and generate the on-chain data OUT by performing preset calculation operations with the i-th decrypted data m_i as follows via a calculation algorithm R.

R({m_i})→OUT, W

Herein, W is a secret value (witness) used in the calculation operations.

Further, the aggregator terminal 200 may generate calculation validation values which prove with the aggregator zero-knowledge proof key that the on-chain data are generated by performing the calculation operations on the 1-st decrypted data to the k-th decrypted data with the preset calculator at a step of S34.

Herein, the aggregator terminal 200 may input the aggregator zero-knowledge proof key, the i-th commitment, the i-th decrypted data and the on-chain data to the zero-knowledge proof module to thereby generate the calculation validation values.

For example, the zero-knowledge proof module may be the zero-knowledge proof module of CP-SNARK, and the aggregator zero-knowledge proof key CRSa, the i-th commitment CM_i, the i-th decrypted data M_i and the on-chain data OUT may be inputted to the CP-SNARK zero-knowledge proof module as follows to generate the calculation validation value π2.

CP-SNARK. Prove(CRSa, {CM_i, M_i, O_i}, OUT:W)→π2

However, the zero-knowledge proof module of the present disclosure is not limited to the CP-SNARK, and may utilize the zero-knowledge proof modules of various zero-knowledge proof algorithms that generate the validation values for the zero-knowledge proof and prove the same.

Then, the aggregator terminal 200 may register the on-chain data and the calculation validation values onto the blockchain network 400 at a step of S35.

Herein, the aggregator terminal 200 may broadcast a transaction including the on-chain data and the calculation validation values to the blockchain network 400. Accordingly, a block may be generated as a result of reaching distributed consensus among the blockchain nodes included in the blockchain network 400, and then the on-chain data and the calculation validation values may be registered onto the blockchain network 400 by adding the block generated to the blockchain of the distributed ledger.

Through this, the aggregator terminal 200 may reliably prove that the on-chain data are generated from the off-chain data without disclosing the off-chain data.

Through the method of providing the oracle service described above, reliability of the on-chain data registered onto the blockchain network 400 is guaranteed for users of the on-chain data.

If necessary, the users may verify the calculation validation value to confirm that the on-chain data are generated from the off-chain data, and may verify the data validation value to confirm that the encrypted data used for generating the on-chain data correspond to the off-chain data.

Herein, in order to verify the data validation value and the calculation validation value, a user may acquire the aggregator zero-knowledge proof key CRSa, the i-th feeder zero-knowledge proof key CRSf_i, the i-th encrypted data CT_i, the i-th commitment CM_i, the i-th data validation value π1_i, the on-chain data OUT and the calculation validation value π2 from the blockchain network 400.

Then, the user may input the i-th feeder zero-knowledge proof key CRSf_i, the i-th encrypted data CT_i, the i-th commitment CM_i and the i-th data validation value π1_i to the zero-knowledge verification module to thereby verify the i-th data validation value.

For example, the zero-knowledge verification module may be the zero-knowledge verification module of CP-SNARK, and the i-th feeder zero-knowledge proof key CRSf_i, the i-th encrypted data CT_i, the i-th commitment CM_i and the i-th data validation value π1_i may be inputted to the CP-SNARK zero-knowledge verification module as follows to generate the data verification value(0 or 1). Herein, the data validation value is determined as true if the data verification value is 1, and the data validation value is determined as false if the data verification value is 0.

CP-SNARK. Verify(CRSf_i, CT_i, CM_i, π1_i)→0/1

However, the zero-knowledge verification module of the present disclosure is not limited to the CP-SNARK, and may utilize the zero-knowledge verification modules of various zero-knowledge proof algorithms that generate the validation values for the zero-knowledge proof and verify the same.

Also, the user may input the aggregator zero-knowledge key, the on-chain data, the i-th commitment and the calculation validation value to the zero-knowledge verification module to thereby verify the calculation validation value.

For example, the zero-knowledge verification module may be the zero-knowledge verification module of CP-SNARK, and the aggregator zero-knowledge key CRSa, the on-chain data OUT, the i-th commitment CM_i and the calculation validation value π2 may be inputted to the CP-SNARK zero-knowledge verification module as follows to generate the data verification value(0 or 1). Herein, the calculation validation value is determined as true if the data verification value is 1, and the calculation validation value is determined as false if the data verification value is 0.

CP-SNARK. Verify(CRSa, OUT, {CM_i}, π2)→0/1

However, the zero-knowledge verification module of the present disclosure is not limited to the CP-SNARK, and may utilize the zero-knowledge verification modules of various zero-knowledge proof algorithms that generate the validation values for the zero-knowledge proof and verify the same.

The present disclosure has an effect of protecting off-chain data provided from feeders, and guaranteeing reliability of the off-chain data.

The present disclosure has another effect of guaranteeing reliability of on-chain data generated by using the off-chain data.

The present disclosure has still another effect of guaranteeing that the on-chain data are generated from the off-chain data while protecting the off-chain data.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing oracle service of a blockchain network by using zero-knowledge proof, comprising steps of:
    (a) in response to each of multiple feeder terminals registering each of data feeder transactions including (i) each of commitments generated by using a commitment key and each of off-chain data, (ii) each of encrypted data generated by encrypting each of the off-chain data with a public key, and (iii) each of data validation values acquired by proving with each of feeder zero-knowledge proof keys that each of the commitments is identical to each of the off-chain data corresponding to each of the encrypted data, onto the blockchain network, acquiring, by an aggregator terminal, a 1-st data feeder transaction to a k-th data feeder transaction, registered onto the blockchain network during a specific period, among the data feeder transactions registered onto the blockchain network for every predetermined period, wherein k is an integer bigger than or equal to 1; and
    (b) (i) verifying, by the aggregator terminal, an i-th data validation value in an i-th data feeder transaction, among the 1-st data feeder transaction to the k-th data feeder transaction, by using an i-th feeder zero-knowledge proof key, wherein i is an integer ranging from 1 to k, and generating, by the aggregator terminal, for each integer i ranging from 1 to k, an i-th decrypted data by decrypting an i-th encrypted data with a private key corresponding to the public key, thus generating a 1-st decrypted data to a k-th decrypted data, (ii) generating, by the aggregator terminal, on-chain data by performing calculation operations on the 1-st decrypted data to the k-th decrypted data with a preset calculator and generating, by the aggregator terminal, calculation validation values acquired by proving with an aggregator zero-knowledge proof key that the on-chain data are generated by performing the calculation operations on the 1-st decrypted data to the k-th decrypted data with the preset calculator, and (iii) registering, by the aggregator terminal, the on-chain data and the calculation validation values onto the blockchain network.

2. The method of claim 1, before the step of (a), further comprising steps of:
    (a0) registering, by the aggregator terminal, the commitment key, the public key and the aggregator zeroknowledge proof key which are issued by a trusted third party onto the blockchain network.

3. The method of claim 2, wherein, at the step of (a), a specific feeder terminal, which is one of the multiple feeder terminals, (i) acquires the commitment key and the public key
    from the blockchain network and thus generates specific encrypted data and a specific commitment for specific offchain data, (ii) generates a specific data validation value by using a specific feeder zero-knowledge proof key issued by the trusted third party, and (iii) registers a specific data feeder transaction including the specific commitment, the specific encrypted data and the specific data validation value onto the blockchain network.

4. The method of claim 3, wherein, in response to the specific feeder terminal making a request for generating the specific feeder zero-knowledge proof key to the trusted third party by using the public key acquired from the blockchain network, the trusted third party generates the specific zero-knowledge proof key by using the commitment key and the public key.

5. The method of claim 2, wherein the aggregator terminal makes a request for generating keys of the preset calculator to the trusted third party and thus instructs the trusted third party to (i) input first security parameters to a first key-generating module so as to generate the commitment key, (ii) input second security parameters to a second key-generating module so as to generate the private key and the public key, (iii) input the commitment key and the preset calculator to a third key-generating module so as to generate the aggregator zero-knowledge proof key, and thus (iv) transmit the commitment key, the private key, the public key and the aggregator zero-knowledge proof key to the aggregator terminal.

6. The method of claim 1, wherein, at the step of (b), the aggregator terminal acquires the i-th feeder zero-knowledge proof key from the blockchain network to verify the i-th data validation value, wherein the i-th feeder zero-knowledge proof key is registered onto the blockchain network by an i-th feeder terminal who registered the i-th data feeder transaction.

7. An aggregator terminal for providing oracle service of a blockchain network by using zero-knowledge proof, comprising:
    at least one memory that stores instructions; and
    at least one processor configured to execute the instructions to perform or support another device to perform:
    (I) in response to each of multiple feeder terminals registering each of data feeder transactions including (i) each of commitments generated by using a commitment key and each of off-chain data, (ii) each of encrypted data generated by encrypting each of the off-chain data with a public key, and (iii) each of data validation values acquired by proving with each of feeder zero-knowledge proof keys that each of the commitments is identical to each of the off-chain data corresponding to each of the encrypted data, onto the blockchain network, a process of acquiring a 1-st data feeder transaction to a k-th data feeder transaction, registered onto the blockchain network during a specific period, among the data feeder transactions registered onto the blockchain network for every predetermined period, wherein k is an integer bigger than or equal to 1; and (II) (i) a process of verifying an i-th data validation value in an i-th data feeder transaction, among the 1-st data feeder transaction to the k-th data feeder transaction, by using an i-th feeder zero-knowledge proof key, wherein i is an integer ranging from 1 to k, and generating, for each integer i ranging from 1 to k, an i-th decrypted data by decrypting an i-th encrypted data with a private key corresponding to the public key, thus generating a 1-st decrypted data to a k-th decrypted data, (ii) a process of generating on-chain data by performing calculation operations on the 1-st decrypted data to the k-th decrypted data with a preset calculator and generating calculation validation values acquired by proving with an aggregator zeroknowledge proof key that the on-chain data are generated by performing the calculation operations on the 1-st decrypted data to the k-th decrypted data with the preset calculator, and (iii) a process of registering the on-chain data and the calculation validation values onto the blockchain network.

8. The device of claim 7, wherein, before the process of (I), the process further performs a process of:

(I0) registering the commitment key, the public key and the aggregator zero-knowledge proof key which are issued by a trusted third party onto the blockchain network.

9. The device of claim 8, wherein, at the process of (I), a specific feeder terminal, which is one of the multiple feeder terminals, (i) acquires the commitment key and the public key from the blockchain network and thus generates specific encrypted data and a specific commitment for specific offchain data, (ii) generates a specific data validation value by using a specific feeder zero-knowledge proof key issued by the trusted third party, and (iii) registers a specific data feeder transaction including the specific commitment, the specific encrypted data and the specific data validation value onto the blockchain network.

10. The device of claim 9, wherein, in response to the specific feeder terminal making a request for generating the specific feeder zero-knowledge proof key to the trusted third party by using the public key acquired from the blockchain network, the trusted third party generates the specific zero knowledge proof key by using the commitment key and the public key.

11. The device of claim 8, wherein the processor makes a request for generating keys of the preset calculator to the trusted third party and thus instructs the trusted third party to (i) input first security parameters to a first key generating module so as to generate the commitment key, (ii) input second security parameters to a second key-generating module so as to generate the private key and the public key, (iii) input the commitment key and the preset calculator to a third key-generating module so as to generate the aggregator zero-knowledge proof key, and thus (iv) transmit the commitment key, the private key, the public key and the aggregator zero-knowledge proof key to the processor.

12. The device of claim 7, wherein, at the processes of (II), the processor acquires the i-th feeder zero-knowledge proof key from the blockchain network to verify the i-th data validation value, wherein the i-th feeder zero-knowledge proof key is registered onto the blockchain network by an i-th feeder terminal who registered the i-th data feeder transaction.

* * * * *